3,092,077
FEEDER FOR STOCK ANIMALS
Isaac Z. Smoker, Intercourse, and Aaron P. Beiler, Gap, Pa., assignors to Sperry Rand Corporation, New Holland, Pa., a corporation of Delaware
Filed Feb. 27, 1962, Ser. No. 176,048
4 Claims. (Cl. 119—52)

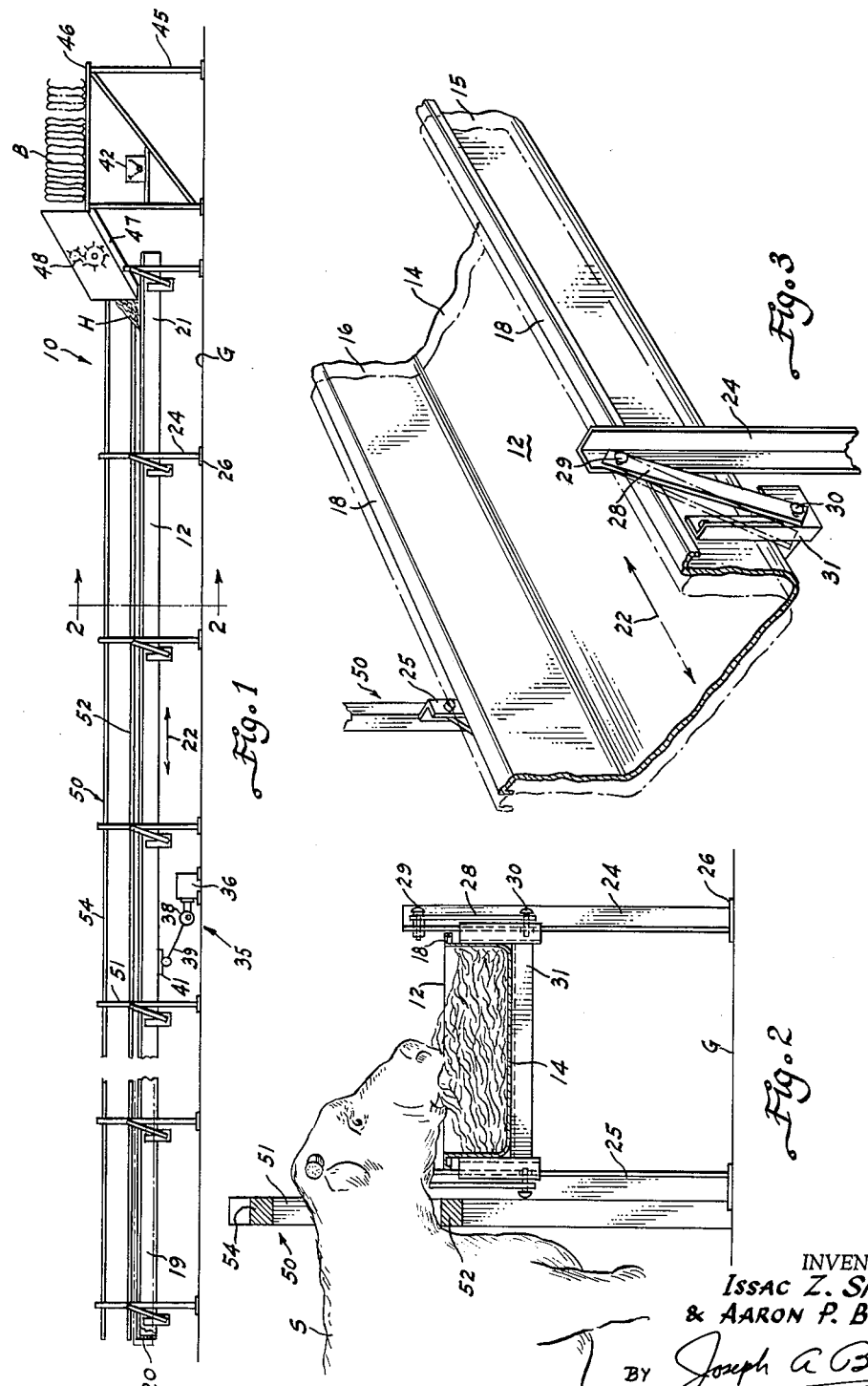

This invention relates to a device for supplying stock animals with hay, forage and the like.

Heretofore, various types of devices have been provided for mechanically delivering feed to stock animals, such as steers. The most common feeder employs an elongated trough from which the animals feed and having an auger for conveying and distributing feed along the length of the trough. Such auger is suitably housed to prevent injury to the animals. Sometimes, the auger is located above the trough and provided with guides so that conveyed feed will drop down into the trough.

Feeders of the trough-auger type involve substantial structure and are therefore costly. If the trough is one hundred feet long, the auger must be of equal length and fabricated steel augers are expensive. Further, the auger must be rotatably supported, usually by hangers at spaced intervals along the length of the auger. In some installations, mechanism is provided for raising and lowering the auger relative to the feed trough to control the amount of feed distributed throughout the trough. All of this structure involves substantial expense.

A main object of this invention is to provide a stock feeder which is exceedingly simple in design, having a number of operative components substantially less than prior feeders whereby the feeder of this invention is inexpensive to manufacture, easy to install and involves practically no maintenance.

Another object of this invention is to provide a stock feeder which completely eliminates the use of augers or other conveying means in combination with a trough to distribute feed therein.

A further object of this invention is to provide a stock feeder of the character described having a fence for controlling the position of the animals relative to the feeder.

Other objects of this invention will be apparent hereinafter from the specification and from the recital in the appended claims.

In the drawings:

FIG. 1 is a part side elevation, part fragmentary section of a stock feeder and fence therefor constructed according to this invention;

FIG. 2 is a section on an enlarged scale taken on the line 2—2 of FIG. 1 looking in the direction of the arrows and showing a steer in position to feed from the feeder trough; and FIG. 3 is an enlarged fragmentary perspective view showing the feeder trough and one of the pair of supports therefor, the trough being shown in one position in solid lines and a second position in dotted lines.

Referring now to the drawings by numerals of reference, and first to FIG. 1, 10 denotes generally a stock feeder which extends horizontally and is supported on the ground G. The feeder may be of any desired length, depending upon the number of animals to be fed and the available space. The feeder comprises a trough 12 having a bottom wall 14 and a pair of vertically extending side walls 15 and 16. The side walls have out turned top edges 18 to form smooth rounded edges along the trough. The terminal end 19 of the trough has a transversely extending end wall 20 which closes the trough. The opposite or inlet end 21 is provided with a similar end wall, not shown.

Preferably, the trough is about thirty three inches wide and twelve inches deep, the corners where the bottom and side walls meet being rounded off as shown in FIGS. 2 and 3. The inside of the trough is constructed to be as smooth as possible so that hay, silage and the like will readily slide along the trough bottom. The trough is supported for oscillatory movement, in a fore-and-aft direction as indicated by the arrows 22, by pairs of support posts 24 and 25, there being sets of posts at spaced intervals along the length of the trough. The support posts comprise simple angle irons having flat base portions 26 which rest upon the ground G. Each support post has an inclined link 28 pivotally connected at 29 to the support post and at 30 to the trough 12. Suitable bracket structure 31 is provided beneath and on the outside of the trough to which the links 28 are pivotally connected.

When viewed as shown in FIG. 1, it will be seen that the links 28 extend downwardly and slightly rearwardly from their pivots 29. Intermediate the ends of the trough, drive means 35 is provided for vibrating and oscillating the trough at about 250 strokes per minute. About a three horsepower motor 36 is provided having an output eccentric 38 which imparts a reciprocating movement to a link 39. One end of the link is connected to the eccentric 38 and the opposite end of the link is connected at 41 to the bottom 14 of the trough 12. A control box 42 is provided for stopping and starting motor 36. When the motor 36 is operating, the link 39 is reciprocated and the trough 12 is oscillated. In its oscillations, the trough swings back and forth on the links 28, feed deposited in the end 21 of trough 12 being conveyed toward end 20. The vibrating structure is conventional and therefore will not be described in greater detail here.

Adjacent the end 21 of the trough 12 a stand 45 is provided having a platform 46 on which bales B may be placed. An inclined ramp 47 communicates with the end 21 of the trough 12 and connects platform 46 with the trough. Mounted on the ramp 47 is a conventional bale disintegrating device 48 so that when the bales B are moved from the platform 46 and down the ramp 47, they are disintegrated and the loosened hay H is deposited in the trough 12.

To operate the feeder, control 42 is used to start the motor 36. This starts the trough 12 vibrating. The operator then feeds the bales B through the disintegrating device 48 so that hay is continuously deposited in the end 21 of trough 12 to provide a substantially unbroken stream of material. The hay will be conveyed and distributed throughout the full length of the trough. It has been found that the "head" of the hay stream will travel toward the terminal end of the trough at a rate of about twenty to thirty feet per minute. When the trough has feed from end to end, motor 36 is shut off and the animals may feed from the trough. A steer S is shown in FIG. 2 standing on the ground G adjacent the feeder and positioned to feed from the trough.

To control the position of the animal relative to trough 12, a fence 50 is provided comprising uprights 51 alongside the support posts 25. These vertical uprights carry horizontal rails which are vertically spaced relative to each other, there being a lower rail 52 and an upper rail 54. The space between these rails is such that the steer S may extend his head between these rails and eat from the trough 12. As shown in FIG. 2, the lower rail 52 is located above the top edge 18 of the adjacent side wall 16 of the trough 12. This controls the position of the head and neck of the animal so that he may not interfere with the oscillation of the trough 12. The upper rail 54 prevents the animals from attempting to climb on top of the feeder structure and thereby damage the feeder.

With the feeder structure described, no auger or other conveying means is provided with the trough 12. The trough in its entirety is mounted on the support posts 24 and 25 for oscillating movement in a fore-and-aft direction to vibrate the entire trough and thereby feed the material from the inlet end 21 to the terminal end 19. Thus, the structure which conveys the feed, and the trough from which the animal feeds, is one and the same. The trough 12 cost no more than a conventional feed trough and the support link structure for the trough and the oscillating means cost substantially less than auger conveying means or other similar apparatus. The simplicity of the structure renders it inexpensive to manufacture, easy to install and maintenance problems are minimal.

While a bale disintegrating device is shown at the inlet end of the trough 12, it will be understood that other inlet feed means could be employed. For example, the feed could come from the spout of a discharge chute of a silo or feed could be deposited in the trough from a self-unloading wagon or the like.

It has been found that when the trough 12 is used for distributing hay, the hay deposited in the end 21 will be conveyed towards the end 19. If the operator fails to shut-off the device, the hay upon reaching wall 20 falls back upon itself as the trough is oscillated and the level of the hay in the trough tends to seek its own level and become evenly distributed throughout the full length of the trough. Therefore, a substantial amount of hay can be deposited in the trough and then evenly distributed throughout the full length thereof. Such distribution requires that the end 20 of the trough be closed off with a vertical end wall.

While this invention has been described in connection with a particular embodiment thereof, it will be understood that it is capable of modification, and this application is intended to cover any variations, uses, or adaptations following, in general, the principles of the invention and including such departures from the present disclosures as come within known or customary practice in the art to which the invention pertains, and as fall within the scope of the invention or the limits of the appended claims.

Having thus described our invention what we claim is:

1. A feeder for supplying hay, silage and the like for steers and other stock animals comprising, in combination, an elongated horizontally extending trough from which the animals feed, means supplying feed to said trough adjacent one end thereof, means pivotally supporting said trough at spaced intervals for vibratory movement in the direction of extension of the trough, drive means connected to said trough and imparting an oscillating movement to the trough in its entirety and operative to cause feed deposited in said one end of the trough to move toward the opposite end thereof, said trough opposite end having an upstanding transverse wall closing the trough, said feed on being conveyed longitudinally through the trough engaging said upstanding wall and being prevented from discharging from said opposite end, the depth of the feed in the trough increasing after the feed has engaged said upstanding wall, and means stopping and starting said drive means.

2. A feeder for supplying hay, silage and like material for steers and other stock animals comprising, in combination, an elongated horizontally extending trough from which the animals feed, said trough having a bottom wall and side walls and said side walls having top edges, means supplying feed to said trough adjacent one end thereof, means pivotally supporting said trough at spaced intervals for vibratory movement in the direction of extension of the trough, drive means connected to said trough and imparting an oscillating movement to the trough in its entirety and operative to cause feed material deposited in said one end of the trough to move toward the opposite end thereof, said trough opposite end having an upstanding transverse wall closing the trough, said feed material on being conveyed longitudinally through the trough engaging said upstanding wall and being prevented from discharging from said opposite end, the depth of the feed in said trough increasing after the feed has engaged said upstanding wall, means stopping and starting said drive means, and a fence coextensive with said trough, said fence having a lower rail extending horizontally and over which animals may extend their heads to feed from the trough, said lower rail being located above said top edges of the trough side walls and preventing the animals from interfering with the oscillation of the trough.

3. A feeder for supplying hay, silage and like material for steers and other stock animals comprising, in combination, an elongated horizontally extending trough from which the animals feed, said trough having a bottom wall and side walls and said side walls having top edges, means supplying feed to said trough adjacent one end thereof, means pivotally supporting said trough at spaced intervals for vibratory movement in the direction of extension of the trough, drive means connected to said trough and imparting an oscillating movement to the trough in its entirety and operative to cause feed material deposited in said one end of the trough to move toward the opposite end thereof, said trough opposite end having an upstanding transverse wall closing the trough, said feed material on being conveyed longitudinally through the trough engaging said upstanding wall and being prevented from discharging from said opposite end, the depth of the feed in said trough increasing after the feed has engaged said upstanding wall, means stopping and starting said drive means, and a fence coextensive with said trough, said fence having a lower rail extending horizontally and over which animals may extend their heads to feed from the trough, said lower rail being located above said top edges of the trough side walls and preventing the animals from interfering with the oscillation of the trough, and said fence having a top rail spaced vertically from said lower rail such a distance that the animals may readily extend their heads between the rails, said top rail preventing the animals from climbing on top of the trough.

4. A feeder for supplying hay, silage and like material for steers and other stock animals comprising, in combination, an elongated horizontally extending trough from which the animals feed, said trough having a bottom wall, side walls and being closed at each end by an upstanding transverse wall, said side walls having top edges, means supplying feed to said trough adjacent one end thereof, means pivotally supporting said trough at spaced intervals for vibratory movement in the direction of extension of the trough, drive means connected to said trough and imparting an oscillating movement of the trough in its entirety and operative to cause feed material deposited in said one end of the trough to move toward the opposite end thereof, said feed material on being conveyed longitudinally through the trough engaging said upstanding wall at said opposite end and being prevented from discharging, the depth of the feed in said trough increasing after the feed has engaged said opposite end upstanding wall, means stopping and starting said drive means, and a fence coextensive with said trough, said fence having a lower rail extending horizontally and over which animals may extend their heads to feed from the trough, said lower rail being located above said top edges of the trough side walls and preventing the animals from interfering with the oscillation of the trough, and said fence having a top rail spaced vertically from said lower rail such a distance that the animals may readily extend their heads between the rails, said top rail preventing the animals from climbing on top of the trough.

References Cited in the file of this patent

UNITED STATES PATENTS

| | | |
|---|---|---|
| 2,725,984 | Klemencic | Dec. 6, 1955 |
| 2,970,568 | Johnson | Feb. 7, 1961 |
| 3,015,308 | Beresford | Jan. 2, 1962 |

FOREIGN PATENTS

| | | |
|---|---|---|
| 716,463 | Great Britain | Oct. 6, 1954 |